(12) United States Patent
Bejot

(10) Patent No.: US 10,110,871 B2
(45) Date of Patent: Oct. 23, 2018

(54) RECORDING HIGH FIDELITY DIGITAL IMMERSIVE EXPERIENCES THROUGH OFF-DEVICE COMPUTATION

(71) Applicant: Disney Enterprises, Inc., Burbank, CA (US)

(72) Inventor: Jason Bejot, Los Angeles, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 92 days.

(21) Appl. No.: 15/338,806

(22) Filed: Oct. 31, 2016

(65) Prior Publication Data

US 2018/0124370 A1 May 3, 2018

(51) Int. Cl.
*H04N 9/87* (2006.01)
*G11B 27/036* (2006.01)
*G06T 11/60* (2006.01)
*H04N 5/77* (2006.01)

(52) U.S. Cl.
CPC .......... *H04N 9/8715* (2013.01); *G06T 11/60* (2013.01); *G11B 27/036* (2013.01); *H04N 5/77* (2013.01)

(58) Field of Classification Search
CPC .......... G06K 9/00671; G06K 9/00664; G06K 9/00577; G06K 9/00624; G06K 7/1443; G06T 19/006
See application file for complete search history.

(56) References Cited

U.S. PATENT DOCUMENTS

| 2014/0178029 | A1* | 6/2014 | Raheman | H04N 5/772 386/224 |
| 2014/0253743 | A1* | 9/2014 | Loxam | H04N 5/232 348/207.1 |
| 2014/0298382 | A1* | 10/2014 | Jo | H04N 5/44582 725/34 |
| 2015/0139540 | A1* | 5/2015 | Moraleda | G06F 17/30247 382/164 |
| 2015/0262208 | A1* | 9/2015 | Bjontegard | G06Q 30/0205 705/7.31 |
| 2017/0004652 | A1* | 1/2017 | Koga | G06K 9/00671 |
| 2017/0105052 | A1* | 4/2017 | DeFaria | H04N 21/2225 |
| 2018/0047214 | A1* | 2/2018 | Kamhi | G06T 19/006 |

* cited by examiner

*Primary Examiner* — Jeffrey Chow
(74) *Attorney, Agent, or Firm* — Sheppard Mullin; Richter & Hampton LLP

(57) ABSTRACT

Systems and methods are described for recording high fidelity augmented reality or virtual reality experiences through off-device computation. In one implementation, an augmented reality system renders an augmented reality object overlaid over a real-world environment; captures video and audio data of the real-world environment during rendering of the augmented reality object; and stores augmented reality object data associated with the rendered augmented reality object. The augmented reality system transmits the augmented reality object data to a server that rerenders the augmented reality object based on the transmitted augmented reality object data to create rerendered augmented reality object data. The augmented reality system receives the rerendered augmented reality object data or a video of the rerendered augmented reality object data composited with the captured video and audio data.

28 Claims, 5 Drawing Sheets

RECORDING HIGH FIDELITY DIGITAL IMMERSIVE EXPERIENCES THROUGH OFF-DEVICE COMPUTATION

TECHNICAL FIELD

The present disclosure relates generally to augmented reality and virtual reality technology, and more particularly, some embodiments relate to systems and methods for recording high fidelity augmented reality or virtual reality experiences through off-device computation.

DESCRIPTION OF THE RELATED ART

Being immersed in augmented reality or virtual reality using a smartphone, head-mounted display, or other augmented reality capable device, may be an engaging and unique experience.

BRIEF SUMMARY OF THE DISCLOSURE

Systems and methods are described for recording high fidelity augmented reality or virtual reality experiences through off-device computation.

In a first embodiment, an augmented reality system renders an augmented reality object overlaid over a real-world environment; captures video and audio data of the real-world environment during rendering of the augmented reality object; and stores augmented reality object data associated with the rendered augmented reality object. The augmented reality system transmits, over a network, the augmented reality object data to a server that rerenders the augmented reality object based on the transmitted augmented reality object data to create rerendered augmented reality object data. The augmented reality system receives, over the network, the rerendered augmented reality object data or a video of the rerendered augmented reality object data composited with the captured video and audio data.

In one implementation of the first embodiment, the augmented reality system transmits, over the network, the captured video and audio data to the server, and the augmented reality system receives the video of the rerendered augmented reality object data composited with the captured video and audio data. In another implementation of the first embodiment, the augmented reality system records the captured video and audio data and receives rerendered augmented reality object data over the network. In this implementation, the augmented reality system may composite the received, rerendered augmented reality object data with the recorded video and audio data to create a high fidelity video recording.

In a second embodiment, a server receives augmented reality object data associated with an augmented reality object rendered by a device during capturing of video and audio data of a real-world environment with an overlaid augmented reality object. The server rerenders the augmented reality object based on the received augmented reality object data to create rerendered augmented reality object data. In one implementation of the second embodiment, the server transmits, over a network, the rerendered augmented reality object data to the device. In another implementation of the second embodiment, the server receives the captured video and audio data and composites the rerendered augmented reality object data with the received, captured video and audio data, to create a video.

As used herein, the term "augmented reality" or "AR" generally refers to a view of a physical, real-world environment that is augmented or supplemented by computer-generated or digital information such as video, sound, and graphics. The digital information is directly registered in the user's physical, real-world environment such that the user may interact with the digital information in real time. The digital information may take the form of images, audio, haptic feedback, video, text, etc. For example, three-dimensional representations of digital objects may be overlaid over the user's view of the real-world environment in real time.

As used herein, the term "virtual reality" or "VR" generally refers to a simulation of a user's presence in an environment, real or imaginary, such that the user may interact with it.

Other features and aspects of the disclosed method will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

The figures are not exhaustive and do not limit the disclosure to the precise form disclosed.

DETAILED DESCRIPTION

Once a live AR or VR experience is over, there is no method to fully relive or review that unique experience. Some devices can record small video segments of an augmented reality experience. However, due to the augmented reality device's processing or memory limitations, computer-generated imagery or other digital objects rendered in the field of view of the augmented reality device are recorded at a low fidelity.

Figure 1A:
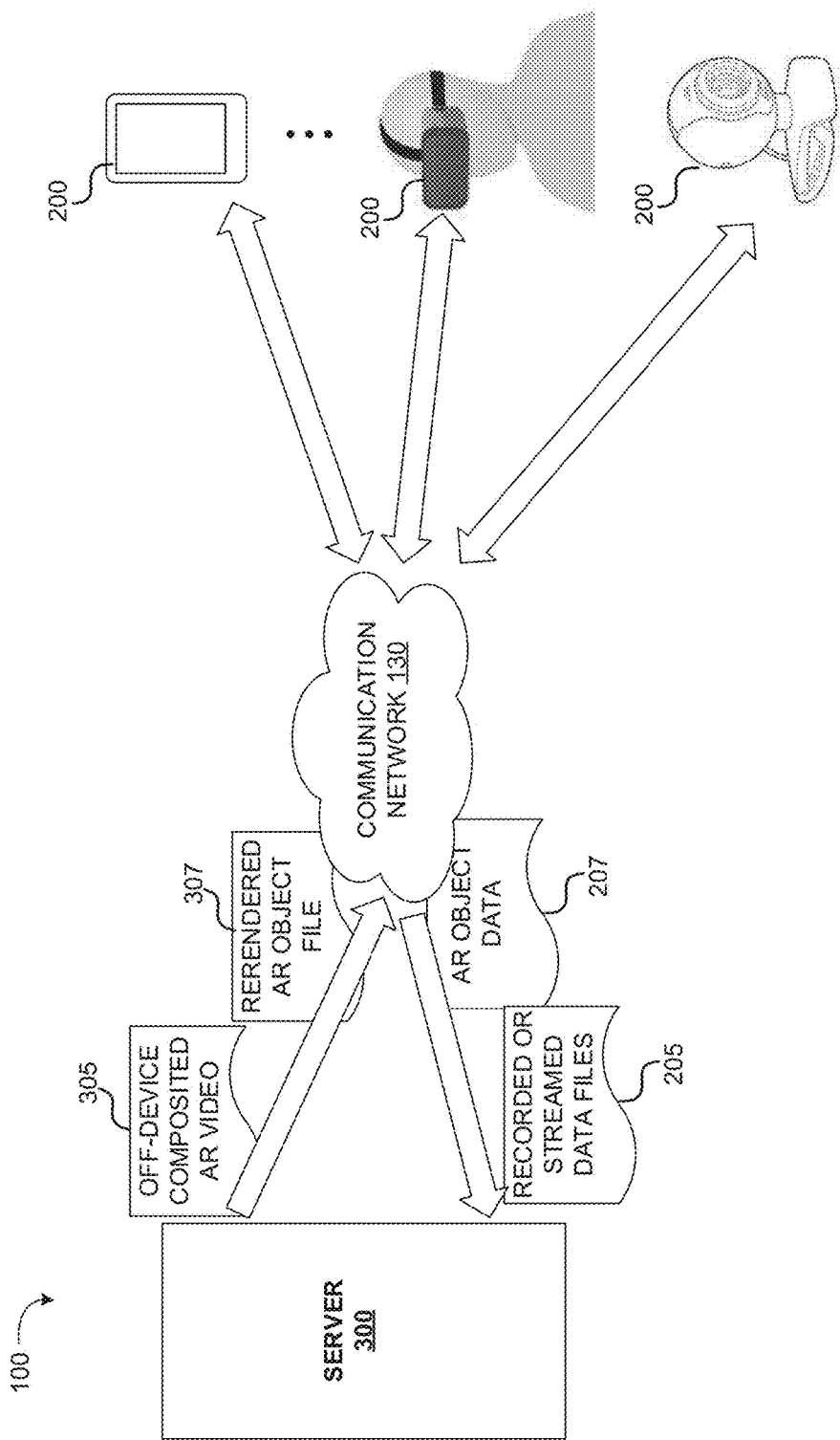
FIG. 1A illustrates a system for recording high fidelity augmented reality experiences through off-device computation in accordance with the disclosure.

Embodiments of the technology disclosed herein are directed to recording high fidelity AR or VR experiences through off-device computation. FIG. 1A illustrates a high-level block diagram of an exemplary system 100 in accordance with the present disclosure. In system 100, an AR device 200 captures an AR experience presented to a user. AR device 200 may include a head-mounted display (HMD), a smartphone, a tablet, a 360-degree camera, or other AR capable device. In some implementations, multiple devices 200 may be used to capture a single AR experience.

Real-world data associated with the AR experience may be captured (e.g., recorded and permanently stored, or cached and streamed) and saved as separate data files corresponding to different data types. For example, audio data (e.g., captured using a smartphone microphone), video data (e.g., captured using a HMD camera), motion sensor data, and GPS sensor data may be stored in separate files. Other data captured by AR device 200 may include physiological sensor data (e.g., user's heartrate) and geometry data of the user's physical space and real-world objects in that physical space. In implementations, the separate files may include time codes or other temporal data that may be used to synchronize the different files together.

Saving the different data streams in separate files may provide several benefits. For example, if there is a point of failure in one of the saved data streams (e.g., sensor data becomes corrupted), the remaining data streams may still be saved and later used to composite the AR experience. In addition, it may free processing bandwidth for AR device 200 to render AR objects. Further, it may facilitate multiple AR devices 200 recording an AR experience (e.g., a HMD recording video and a smartphone recording audio). In alternative implementations, the real-world data corresponding to different data streams may be saved in the same file. For example, an audiovisual recording of the real-world environment may be stored in one file.

AR device 200 may also capture or log AR object data 207 associated with digital objects that augment the user's view of the real-world environment during the recorded AR experience. By way of example, the digital objects may include information overlaid on the real-world environment, such as 2D or 3D graphics (e.g., moving animated characters), images, sounds, selectable markers, haptic feedback, olfactory feedback, etc.

In one implementation, logged AR object data 207 comprises metadata of the digital objects rendered and overlaid over the user's real-world environment during presentation of the AR experience. The metadata may include, for example, an identifier of the AR object (e.g., a unique ID or name), an identifier of the AR object type (e.g., image or sound), spatial data (e.g., coordinates of the AR object relative to the real-world environment or a video frame), temporal data (e.g., time codes specifying when the AR object is presented), and other metadata that may be used to register, identify, or render the AR object. In further implementations, the data of the digital objects themselves may also be recorded (e.g., as video and/or audio files).

After or during capture of the AR experience, AR device 200 transmits, over communication network 130, the recorded or streamed data files 205 and/or logged AR object data 207 to a server 300. The server 300 may rerender the AR objects to create a rerendered AR object file 307, and composite the file with the real-world data (e.g., video and audio) to create an off-device composited AR video 305. Server 300 may also adjust the composited AR video 305 (e.g., white balance, color correction, exposure, audio frequency conflicts, sharpness, etc.). In this manner, the AR experience may be recorded or edited at a higher fidelity (e.g., higher resolution, higher frame rate, higher bit rate, higher average or peak signal-to-noise ratio, etc.) than AR device 200 is capable of capturing. In implementations, server 300 may rerender AR objects and composite high fidelity AR videos for a plurality of AR devices 200.

By way of illustrative example, a user wearing an AR HMD at a theme park may be presented with an AR experience that is rendered and/or recorded using the HMD. The AR experience may overlay animated characters over the theme park's environment. For instance, the animated characters may guide the user on a tour. Data associated with the AR experience may be transmitted to a local or remote server that rerenders the AR objects (e.g., images and sounds from animated characters) presented during the AR experience, and creates a high fidelity video recording of this AR experience based on the rerendering. Thereafter, the video of the theme park AR experience may be made available online to the user (e.g., as part of a cloud-based server) or by physical drive (e.g., a flash drive).

It should be noted that although a server is illustrated in system 100 as generating an off-device composited AR video 305, in other implementations other devices may be used to generate video 305. For example, a user's workstation, tablet, or smartphone may be used to rerender an AR experience captured using a HMD.

Figure 1B:
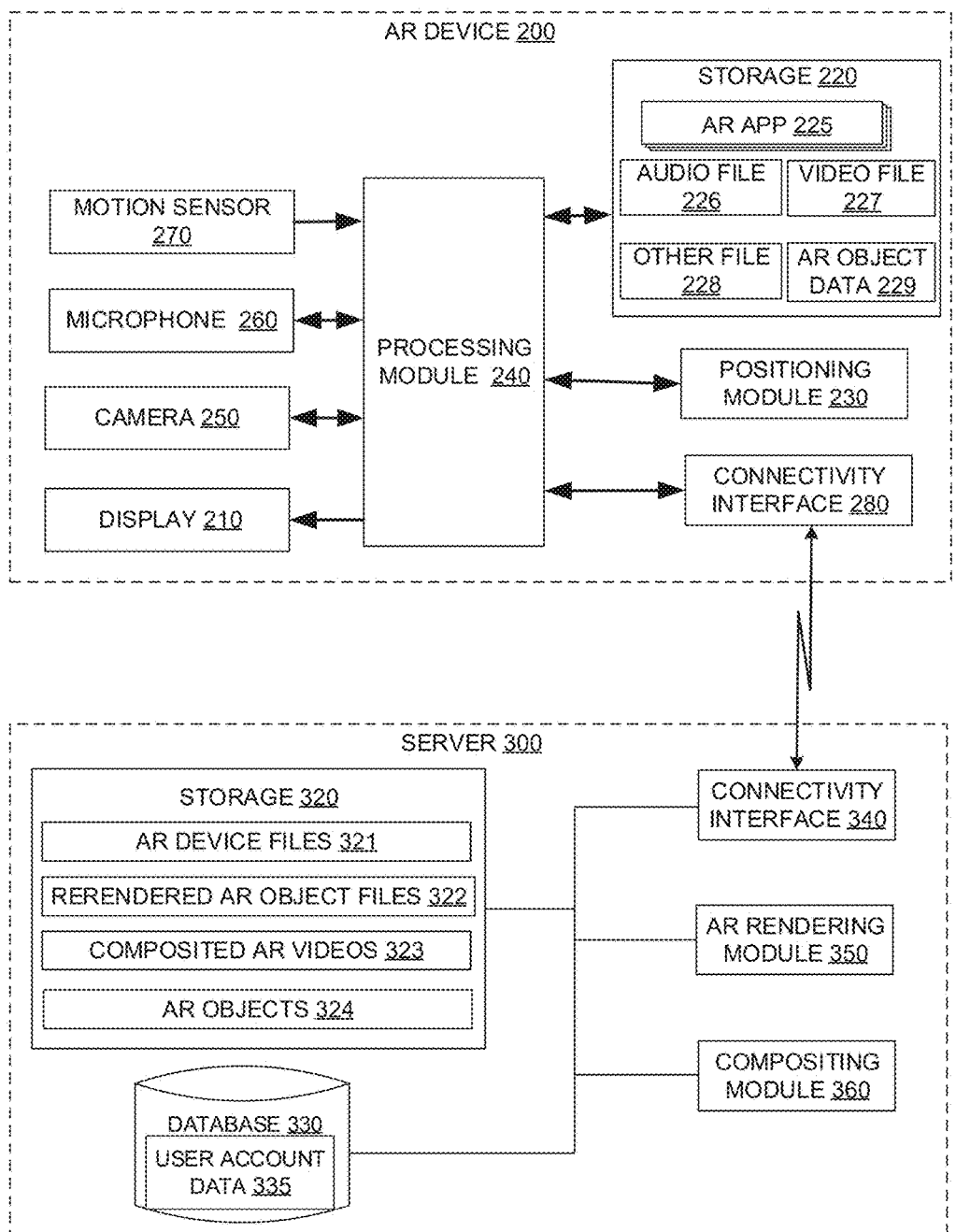
FIG. 1B is a block diagram illustrating an example architecture for components of an augmented reality device and a server in accordance with embodiments of the disclosure.

FIG. 1B is a block diagram illustrating an example architecture for components of an AR device 200 and a server 300 that may be used in an example implementation to record high-fidelity AR experiences through off-device computation. AR device 200 may be any display system (e.g., a HMD, smartphone, tablet, projector, etc.) that may generate an AR view of a user's real world environment (e.g., by displaying AR imagery overlaid over the real world environment). In one particular implementation, AR device 200 includes a head-mounted display system (e.g., glasses, goggles, a visor, helmets, smartphone, etc.). In this implementation, the HMD may be tethered or untethered.

AR device 200 may include a display 210, storage 220, positioning module 230, processing module 240, camera 250, microphone 260, motion sensor 270, and connectivity interface 280.

Display 210 may be an AR display such as an optical see-through display (e.g., a transparent OLED or LED screen that uses a waveguide to display the digital objects overlaid over the real-world environment) or video see-through display that supplements video of the user's real world environment with overlaid digital objects.

Storage 220 may comprise volatile memory (e.g. RAM), non-volatile memory (e.g. flash storage), or some combination thereof. In various embodiments, storage 220 stores an AR application 225, that when executed by processing module 240 (e.g., a digital signal processor), generates a recordable AR experience. For example, the AR experience may display overlaid imagery and generate directional sound. Execution of the AR application 225 may also display a graphical user interface (GUI) that permits a user to select, create, and/or register digital objects in the user's real-world environment. For example, in the case of visual digital objects, a user may select a digital object's general shape, size, orientation, texture, and color. As another example, a user may associate sounds with particular locations or visual objects. Alternatively, digital objects may be automatically generated or retrieved from the Internet.

The GUI displayed by executing AR application 225 may include selectable controls for: starting a recording or stream of an AR experience, stopping a recording or stream of an AR experience, enabling/disabling off-device (e.g., server) generation of high fidelity recordings, displaying links to high fidelity recordings, etc. In a particular implementation, AR application 225 may generate a notification when a high fidelity recording is available for local playback, download from a server, or streaming from a server.

Additionally, storage 220 may store data associated with a recorded AR experience. For example, data of the real-world environment may be captured as an audio file 226, a video file 227, and other files 228 (e.g., a file with motion sensor or GPS data). In implementations, where the data is streamed to a server 300, files 226-229 may be temporarily cached (e.g., in segments). Alternatively, files 226-229 may be permanently stored in storage 220 as part of a recording. Additionally, storage 220 may store AR object data 229 associated with a captured AR experience. For example, metadata of the rendered AR objects (e.g., AR object identifier, temporal data, spatial data, etc.) or data of the digital objects themselves (e.g., sound, images, video, etc.) may be stored.

Positioning module 230 may comprise one or more devices for retrieving positional information over a network. For example, positioning module 230 may include a global positioning system (GPS) receiver, a cellular receiver, a network interface card, an altimeter, or some combination thereof. The positional information retrieved by module 230 may be processed by processing module 240 to determine the geographical coordinates of AR device 200 during an AR experience. For example, application software installed in storage 220 may use the location of AR device 200 from a GPS reading along with a map of declination (e.g., stored or retrieved from a network) to determine the geographical coordinates of AR device 200. For an AR experience recording, positional information may be saved as an AR data file in storage 220.

Camera 250 may capture a video stream of the real world environment during an AR experience. The captured video stream may be encoded using a suitable video codec (e.g., H.265/MPEG-4) and stored as a video file 227 in storage 220. Additionally, AR software application 225 may use the captured video stream to register AR objects with the real world environment and overlay them to create an AR environment. For example, in embodiments where display 210 is a video display, the digital video stream captured by camera is overlaid with digital objects. In embodiments, camera 250 may comprise an omnidirectional camera or multiple cameras capturing multiple fields of view.

Microphone 260 may capture vocal input from a user of AR device 200. Microphone 260 may be any transducer that converts sound into an electric signal that is converted to digital form. For example, microphone 260 may be a digital microphone including an amplifier and analog to digital converter. Alternatively, processing module 240 may digitize the electrical signals generated by microphone 260. The digitized audio stream may be encoded using a suitable audio codec (e.g., MP3 or FLAC) and stored as an audio file 226 in storage 220.

Motion sensor 270 generates electronic signals representative of the motion or position of AR device 200. These electronic input signals may be received and processed by circuitry of processing module 240 during an AR experience to determine the motion of a user of AR device 200 and an absolute orientation of AR device 200 in the north-east-south-west (NESW) and up-down planes. For a particular AR experience recording, this orientation information may be saved as an AR data file in storage 220. In various embodiments, motion sensor 270 may comprise one or more gyroscopes, accelerometers, and magnetometers.

Connectivity interface 280 may connect AR device 200 to server 300 through a communication medium using one or more communication protocols. For example, connectivity interface 280 may comprise a cellular transceiver, a network interface card, or some other interface for connecting AR device 200 to a cellular network system, a WiFi network, or other network.

Turning now to server 300, it may include a storage 320, a database 330, a connectivity interface 340, an AR rendering module 350, and a compositing module 360. Server 300 may be implemented as an application server and may be cloud-based. Server 300 may comprise a plurality of servers (i.e., a server farm).

During operation, server 300 may receive captured files 226-228 and/or AR object data 229 of an AR experience over connectivity interface 340. AR rendering module 350 may rerender the AR objects associated with the AR experience, and compositing module 360 may composite the rerendered AR objects with the captured files to create a higher fidelity AR recording (i.e., a composited AR video 322) that is made available to AR device 200 for download and/or streaming. In an alternative implementation, server 300 may transmit a rerendered AR object file 322 to AR device 200. In this implementation, AR device 200 may composite the rerendered AR object file with its stored recording files to locally create a high fidelity AR video recording.

Storage 320 may store AR device files 321 received from AR devices 200, rerendered AR object files 322, and composited AR videos 323. Additionally, storage 320 may store AR objects 324 that may be used to rerender the AR objects of an AR experience recorded by an AR device.

Database 330 may store user account data 335 associated with one or more user accounts registered to receive rendered AR object files 322 and/or composited AR videos 323 from server 300. The stored user account data 335 may include, for example, an identification of the primary user's name, an account name, an account password, information relating to the user's account subscription, etc. By way of example, an AR device 200 executing AR application 225, logged into a registered user account, may upload files associated with an AR experience to server 300. It may also receive AR object files 322 and/or composited AR videos 323.

Figure 2:
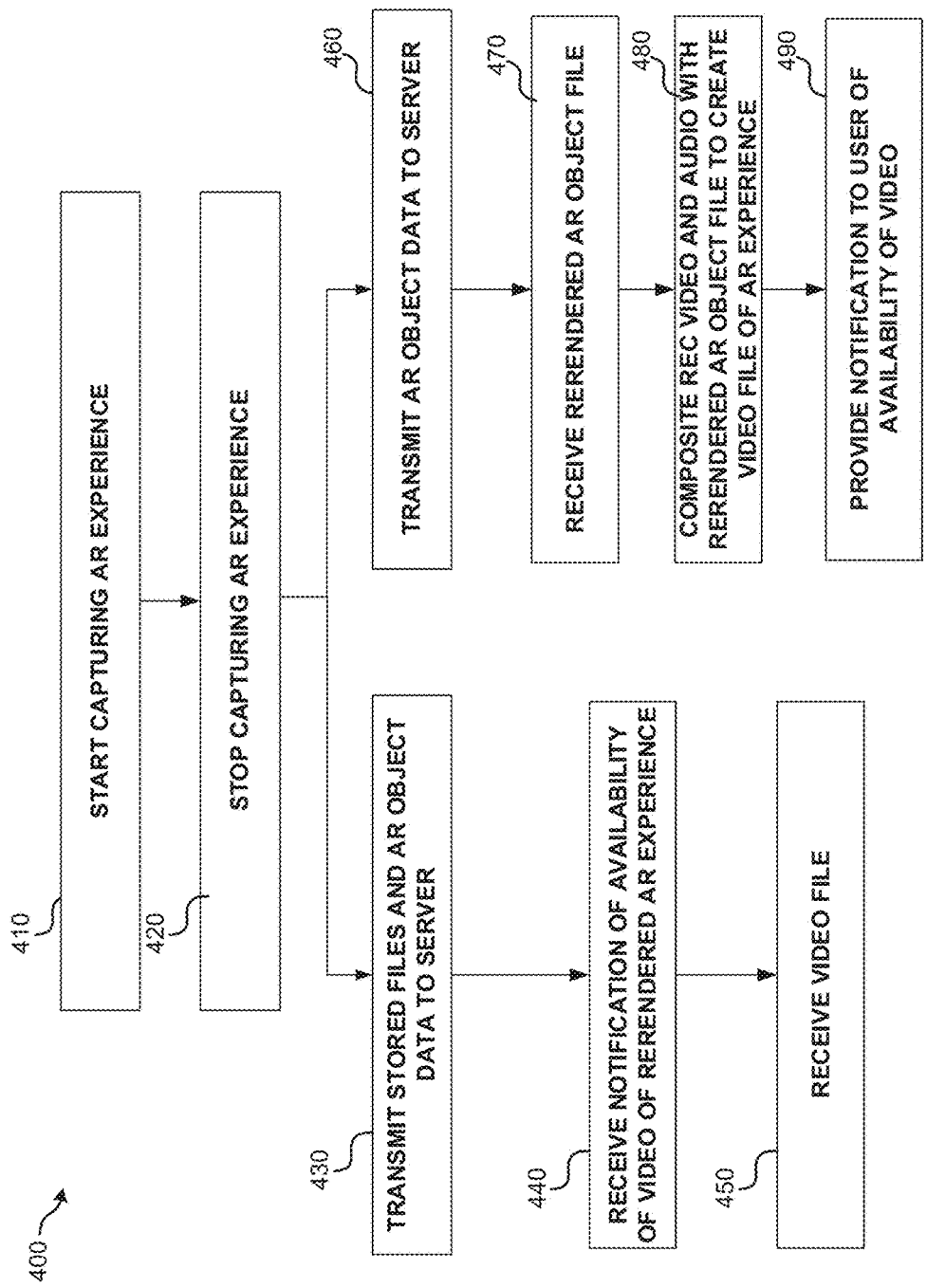
FIG. 2 is an operational flow diagram illustrating an example method that may be implemented using the augmented reality device of FIGS. 1A-1B.

FIG. 2 is an operational flow diagram illustrating an example method 400 that may be implemented using an AR device 200. For example, method 400 may be implemented by a processor executing AR application 225. Prior to or in parallel to method 400, AR device 200 may render and present AR objects to a user of AR device 200.

At operation 410, the AR device initiates capturing (e.g., recording or streaming) of an AR experience. For example, a user of a user interface presented by AR application 225 may select a control for starting a recording or data stream (e.g., a data stream to a server 300). During data capture, real-world data associated with the AR experience may be saved as separate data files corresponding to different data types. For example, audio data captured by a microphone 260, video data captured by a camera 250, motion sensor data captured by a motion sensor 270, and GPS sensor data may be written to separate files during recording or streaming. In implementations, the separate files may include time codes or other temporal data that may be used to synchronize the different files together. Alternatively, a separate log file may include temporal data and pointers to segments of the different files for synchronizing the files together.

AR device 200 may also record or log AR object data associated with digital objects that are rendered during the AR experience. In one implementation, metadata of the rendered AR objects (e.g., AR object identifier, temporal data, spatial data, AR object type, etc.) may be stored. Additionally, data of the digital objects themselves may be stored. For example, AR imagery (e.g., generated by AR application 225), AR sounds (e.g., generated by AR application 225), and other AR objects may be saved to one or more files.

In alternative implementations, the real-world data corresponding to different data streams and/or the AR objects may all be saved to the same file (e.g., a video file).

At operation 420, data capture of the AR experience stops. Data capture may stop after a user selects a stop control presented by a user interface, after a predetermined amount of time, after a storage of AR device 200 reaches capacity, after an AR application 225 automatically stops the recording/streaming, etc.

As noted above, in a first implementation a server 300 may create and make available a composited AR video 323 that is a high fidelity recording of the AR experience (operations 430-450). Alternatively, in a second implementation the server may create and make available one or more rerendered AR object files (e.g., file 322) that AR device 200 may use to create a composited AR video that is a high fidelity recording of the AR experience (operations 460-490).

In the first implementation, at operation 430 the AR device 200 transmits the streamed or stored recording files (e.g., video data, audio data, motion sensor data, etc.) to server 300 over communication network 130. Additionally, the stored object data may be transmitted to server 300. In implementations where AR device 200 streams the files to server 300, operation 430 may be initiated when capture of the AR experience begins (operation 410) and may continue until all captured data has been streamed to the server (e.g., some time after operation 420). Transmission of the data may also be initiated in response to a recording stopping, in response to a user request, in response to a predetermined amount of time passing, or in response to another event.

AR device 200 may receive a notification of the availability of a server-created AR video at operation 440. For example, AR application 225 may generate the notification after an application server finishes creating the AR video. At operation 450, the AR device 200 receives the video. The video may be downloaded from a server 300 or streamed from server 300. In one implementation, the creator of the original recording may share the video stored on server 300 with other users (registered or non-registered).

In the second implementation, as the AR device 200 itself composites the final AR video, it may not need to upload recorded video or audio of the AR experience. Accordingly, in this second implementation the AR device 200 may transmit only the AR object data (e.g., AR object metadata) to the server at operation 460. In embodiments, the AR device 200 may also transmit recorded sensor data (e.g., accelerometer or gyroscope movement data) that may be used to align the AR object data. Transmission of the data may be initiated in response to a recording stopping, in response to a user request, in response to a predetermined amount of time passing, or in response to another event.

AR device 200 then receives a rerendered AR object file at operation 470. As noted above, the rerendered AR object file may provide a higher fidelity representation of the AR objects than AR device 200 is capable of rendering because of processing limitations, time limitations, storage limitations, or some combination thereof. For example, the higher fidelity AR objects may be rendered at a higher frame rate or bit rate with a higher average or peak signal-to-noise ratio. Additionally the higher fidelity AR objects may comprise: a larger polygon count, a larger texture size, more color depth, or other additional detail. In implementations, multiple rerendered AR object files may be received for multiple rerendered AR data types. For example, a rerendered AR object video file and a rerendered AR audio object file may be received.

At operation 480, AR device 200 composites the one or more rerendered AR object files with the recorded video and audio files of the AR experience to create a high fidelity video file of the AR experience. In one implementation, software executed by a processor of the mobile device (e.g., as part of application 225) automatically combines the recorded video and audio files with the rerendered AR object files. In another implementation, a user may manually combine the recorded files with the rerendered AR object files. Following compositing, AR device 200 may also apply enhancements or corrections to the video file (e.g., white balance, coloring effects, audio equalization, etc.) At optional operation 490, AR device 200 may notify the user (e.g. through AR application 225) that the AR video is available for playback.

Figure 3:
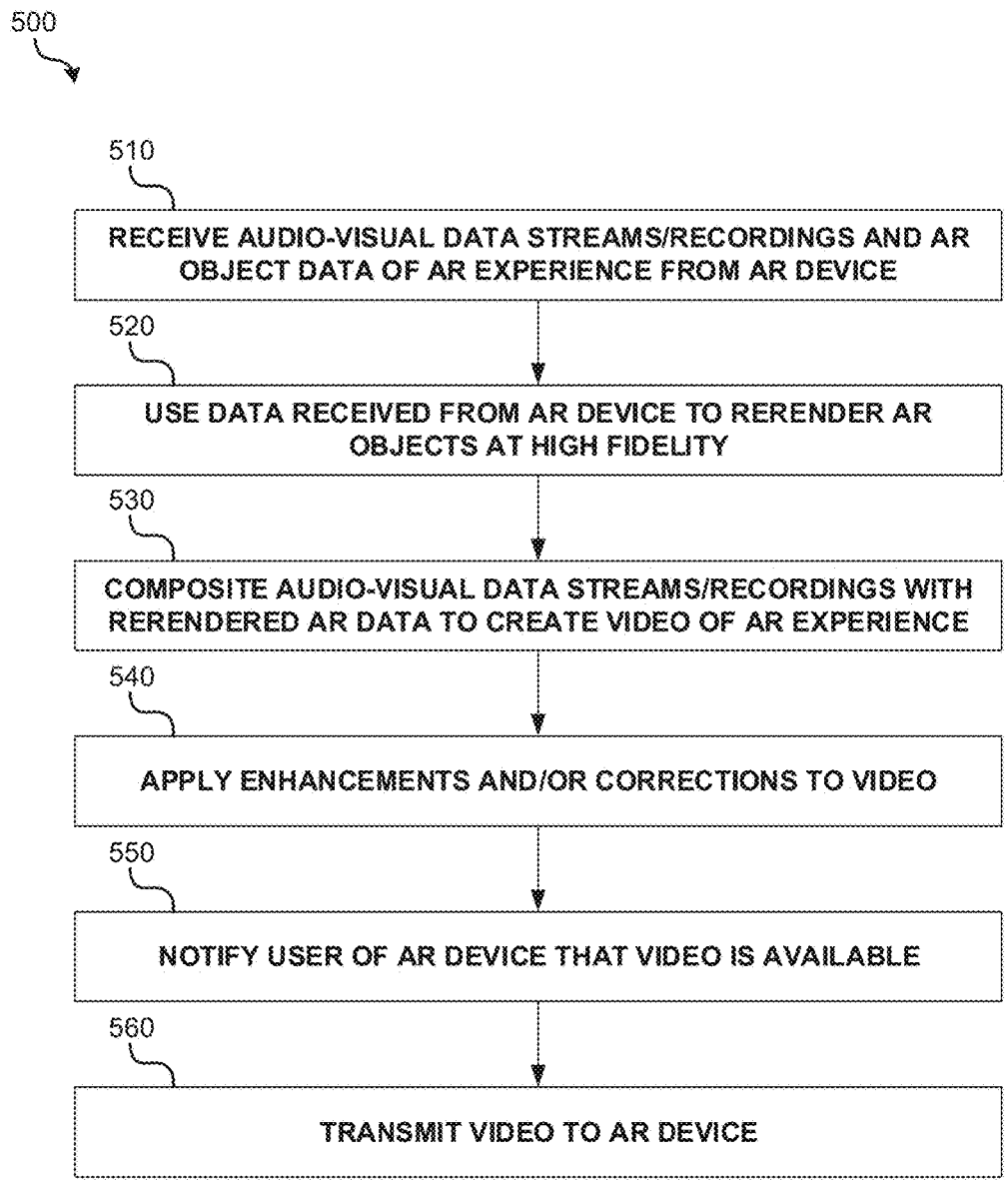
FIG. 3 is an operational flow diagram illustrating an example method that may be implemented by the server of FIGS. 1A-1B.

FIG. 3 is an operational flow diagram illustrating an example method 500 that may be implemented using a server 300. At operation 510, the server 300 receives data files associated with a captured AR experience. For example, the server may receive recorded/streamed real-world data (e.g., video file, audio file, sensor file, etc.) and AR object data (e.g., metadata of the AR objects or data of AR objects themselves) captured by the AR device 200 during the AR experience.

At operation 520, the server uses the data received from the AR device to rerender the AR objects associated with the AR experience at a high fidelity. For example, the server may rerender the AR imagery and AR audio of the captured AR experience. In one particular implementation, the server may use metadata identifying the AR objects (e.g., an object ID, object type, object shape data, etc.) to rerender the same AR objects originally presented to the user during the AR experience. The rerendered AR objects may be synchronized in time and space using other received AR object metadata (e.g., spatial data and temporal data) and/or real-world data that was captured. For example, real-world spatial data captured by a motion sensor (e.g., an accelerometer) or positioning module (e.g., a GPS) may be used along with temporal data (e.g., the time the motion sensor or positioning module data was captured) to synchronize the objects in space and time. Other data that may be taken into account during rerendering of the AR objects may include environmental data (e.g., temperature, pressure, lighting) captured during the AR experience.

Following rerendering, the server may transmit a rerendered AR object file to the AR device for compositing. Alternatively, at operation 530, the server itself composites the rerendered AR objects (e.g., imagery and audio) with the captured real-world data (e.g., video and audio) of the AR experience to create a high fidelity composite AR video. In one implementation, software executed by a processor of the server automatically combines the captured video and audio files with the rerendered AR object files. In another implementation, a user may manually combine the captured files with the rerendered AR object files.

At operation 540, the server may apply enhancements or corrections to the composite AR video. For example, the server may correct white balance, adjust tonality, adjust sharpness, remove video artifacts, improve color (e.g., hue and saturation), apply coloring effects or other video filters, equalize the audio, remove or reduce background noise, resolve audio frequency conflicts, etc. In an alternative implementation, enhancements or corrections may be applied to the captured real-world video and audio files prior to compositing them with the rerendered AR objects.

At operation 550, the server may notify the AR device (e.g., through AR application 225) that the AR video is available for download or streaming, and at operation 560, the AR video may be transmitted (i.e., downloaded or streamed) to the AR device.

Although the systems and methods disclosed herein have been described with reference to recording high fidelity AR experiences through off-device computation, the systems and methods may also be applied to record high fidelity VR experiences through off-device computation. For example, an audiovisual stream of a VR experience may be transmitted to a server that rerenders and/or applies enhancements to the video. In cases where a local VR device does not capture audiovisual data of the VR experience, the server may create a high fidelity recording of the VR experience based on captured user input and/or user-specific (i.e., experience-specific) digital object data rendered during the VR experience. For example, where the environment of the VR experience is predetermined (e.g., all users experience the same base audio-visual experience), the captured user input and/or user-specific digital object data may be used to create a high fidelity VR recording at the server.

Figure 4:
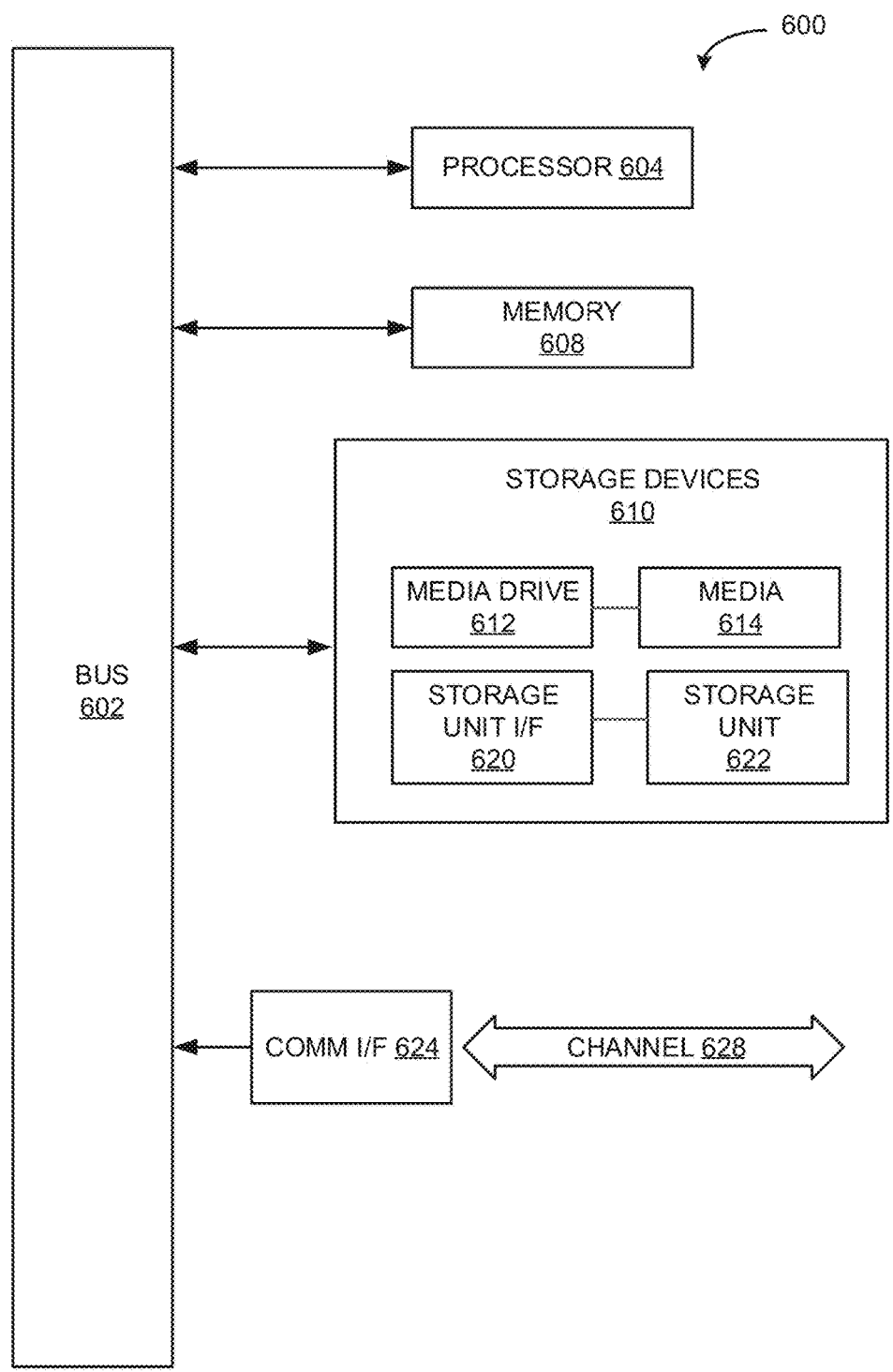
FIG. 4 illustrates an example computing module that may be used to implement various features of the methods disclosed herein.

FIG. 4 illustrates an example computing module that may be used to implement various features of the methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 4. Various embodiments are described in terms of this example—computing module 600. After reading this description, it will become apparent to a person skilled in the relevant art how to implement the application using other computing modules or architectures.

Referring now to FIG. 4, computing module 600 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 600 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing module 600 or to communicate externally.

Computing module 600 might also include one or more memory modules, simply referred to herein as main memory 608. For example, preferably random access memory (RAM) or other dynamic memory, might be used for storing information and instructions to be executed by processor 604. Main memory 608 might also be used for storing temporary variables or other intermediate information during execution of instructions to be executed by processor 604. Computing module 600 might likewise include a read only memory ("ROM") or other static storage device coupled to bus 602 for storing static information and instructions for processor 604.

The computing module 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid state drive, a magnetic tape drive, an optical disk drive, a CD or DVD drive (R or RW), or other removable or fixed media drive might be provided. Accordingly, storage media 614 might include, for example, a hard disk, a solid state drive, magnetic tape, cartridge, optical disk, a CD, DVD, or Blu-ray, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing module 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a PCMCIA slot and card, and other fixed or removable storage units 622 and interfaces 620 that allow software and data to be transferred from the storage unit 622 to computing module 600.

Computing module 600 might also include a communications interface 624. Communications interface 624 might be used to allow software and data to be transferred between computing module 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory media, volatile or non-volatile, such as, for example, memory 608, storage unit 622, and media 614. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

What is claimed is:

1. A method, comprising:
   rendering an augmented reality object overlaid over a real-world environment;
   capturing video and audio data of the real-world environment during rendering of the augmented reality object;
   storing augmented reality object data associated with the rendered augmented reality object;
   transmitting, over a network, the augmented reality object data to a server, wherein the server rerenders the augmented reality object based on the transmitted augmented reality object data to create rerendered augmented reality object data, wherein the rerendered augmented reality object data provides a higher fidelity representation of the rendered augmented reality object; and receiving, over the network, the rerendered augmented reality object data or a video of the rerendered augmented reality object data composited with the captured video and audio data.

2. The method of claim 1, wherein the video of the rerendered augmented reality object data composited with the captured video and audio data is received over the network, wherein the method further comprises: transmitting, over the network, the captured video and audio data to the server.

3. The method of claim 2, wherein receiving the video of the rerendered augmented reality object data composited with the captured video and audio data comprises: streaming the video from a server.

4. The method of claim 2, wherein receiving the video of the rerendered augmented reality object data composited with the captured video and audio data comprises: downloading the video from a server.

5. The method of claim 2, wherein the video and audio data are stored as a respective video file and audio file, and wherein transmitting the recorded video and audio data comprises transmitting the video file and the audio file to the server.

6. The method of claim 1, wherein capturing the video and audio data comprises recording the video and audio data, wherein the rerendered augmented reality object data is received over the network, and wherein the method further comprises: compositing the received, rerendered augmented reality object data with the recorded video and audio data to create a video.

7. The method of claim 1, wherein the augmented reality object comprises an image, wherein the augmented reality object data comprises metadata of the image, the metadata comprising at least one of: an identifier of the image, spatial data of the images, and temporal data of the image.

8. The method of claim 2, wherein the captured video and audio data is streamed to the server.

9. A system, comprising:
a processor;
a non-transitory computer-readable medium having instructions stored thereon that, when executed by the processor, cause the system to:
render an augmented reality object overlaid over a real-world environment;
capture video and audio data of the real-world environment during rendering of the augmented reality object;
store augmented reality object data associated with the rendered augmented reality object;
transmit, over a network, the augmented reality object data to a server, wherein the server rerenders the augmented reality object based on the transmitted augmented reality object data to create rerendered augmented reality object data, wherein the rerendered augmented reality object data provides a higher fidelity representation of the rendered augmented reality object; and
receive, over the network, the rerendered augmented reality object data or a video of the rerendered augmented reality object data composited with the captured video and audio data.

10. The system of claim 9, wherein the video of the rerendered augmented reality object data composited with the captured video and audio data is received over the network, wherein the instructions, when executed by the processor, further cause the system to: transmit over the network, the captured video and audio data to the server.

11. The system of claim 10, wherein the instructions, when executed by the processor, further cause the system to: generate a notification when the composited video is available for retrieval.

12. The system of claim 9, wherein the rerendered augmented reality object data is received over the network, wherein the instructions, when executed by the processor, further cause the system to: composite the received, rerendered augmented reality object data with the captured video and audio data to create a video.

13. The system of claim 9, wherein the augmented reality object comprises an image, wherein the augmented reality object data comprises metadata of the image, the metadata comprising at least one of: an identifier of the image, spatial data of the images, and temporal data of the image.

14. The system of claim 9, further comprising:
a camera for capturing the video data;
a microphone for capturing the audio data;
a storage for caching or permanently storing the captured video data and audio data; and
a display for displaying the rendered augmented reality object overlaid over the real-world environment.

15. The system of claim 14, where the system consists of one or more of a head-mounted display, a smartphone, or a tablet.

16. The system of claim 10, wherein the captured video and audio data is streamed to the server.

17. A method, comprising:
receiving, at a server, augmented reality object data associated with an augmented reality object rendered by a device during capturing of video and audio data of a real-world environment that the augmented reality object is overlaid over; and
rerendering, at the server, the augmented reality object based on the received augmented reality object data to create rerendered augmented reality object data, wherein the rerendered augmented reality object data provides a higher fidelity representation of the rendered augmented reality object.

18. The method of claim 17, further comprising: transmitting, over a network, the rerendered augmented reality object data to the device.

19. The method of claim 17, further comprising:
receiving, at the server, the captured video and audio data; and
compositing, at the server, the rerendered augmented reality object data with the received, captured video and audio data, to create a video.

20. The method of claim 19, further comprising: applying enhancements or corrections to the created video, wherein the enhancements or corrections comprise one or more of: white balance correction, tonality adjustment, coloring adjustment, a video filter, audio equalization, background noise removal, and audio frequency correction.

21. The method of claim 19, further comprising: the server transmitting a notification to the device that the created video is available for download or streaming.

22. The method of claim 19, wherein the video and audio data are stored to a respective video file and audio file, and wherein receiving the recorded video and audio data comprises receiving the video file and the audio file.

23. The method of claim 17, wherein the augmented reality object comprises an image, wherein the augmented reality object data comprises metadata of the image, the metadata comprising at least one of: an identifier of the image, spatial data of the images, and temporal data of the image.

24. A server system, comprising:
a processor;
a non-transitory computer-readable medium having instructions stored thereon that, when executed by the processor, cause the server system to:
receive:
augmented reality object data associated with an augmented reality object rendered by a device during capturing of video and audio data of a real-world environment that the augmented reality object is overlaid over; and
the captured video and audio data;
rerender the augmented reality object based on the received augmented reality object data to create rerendered augmented reality object data, wherein the rerendered augmented reality object data provides a higher fidelity representation of the rendered augmented reality object; and
composite the rerendered augmented reality object data with the received, captured video and audio data, to create a video.

25. The server system of claim 24, wherein the instructions, when executed by the processor, further cause the server system to: apply enhancements or corrections to the created video, wherein the enhancements or corrections comprise one or more of: white balance correction, sharpness adjustment, tonality adjustment, coloring adjustment, a video filter, audio equalization, background noise removal, and audio frequency correction.

26. The server system of claim 24, wherein the augmented reality object comprises an image, wherein the augmented reality object data comprises metadata of the image, the metadata comprising at least one of: an identifier of the image, spatial data of the images, and temporal data of the image.

27. The server system of claim 24, further comprising: a database, wherein the database stores user account information associated with a user of the device.

28. The server system of claim 27, wherein the instructions, when executed by the processor, further cause the server system to: transmit a notification to the user account that the created video is available for download or streaming.

* * * * *